Figure 1:
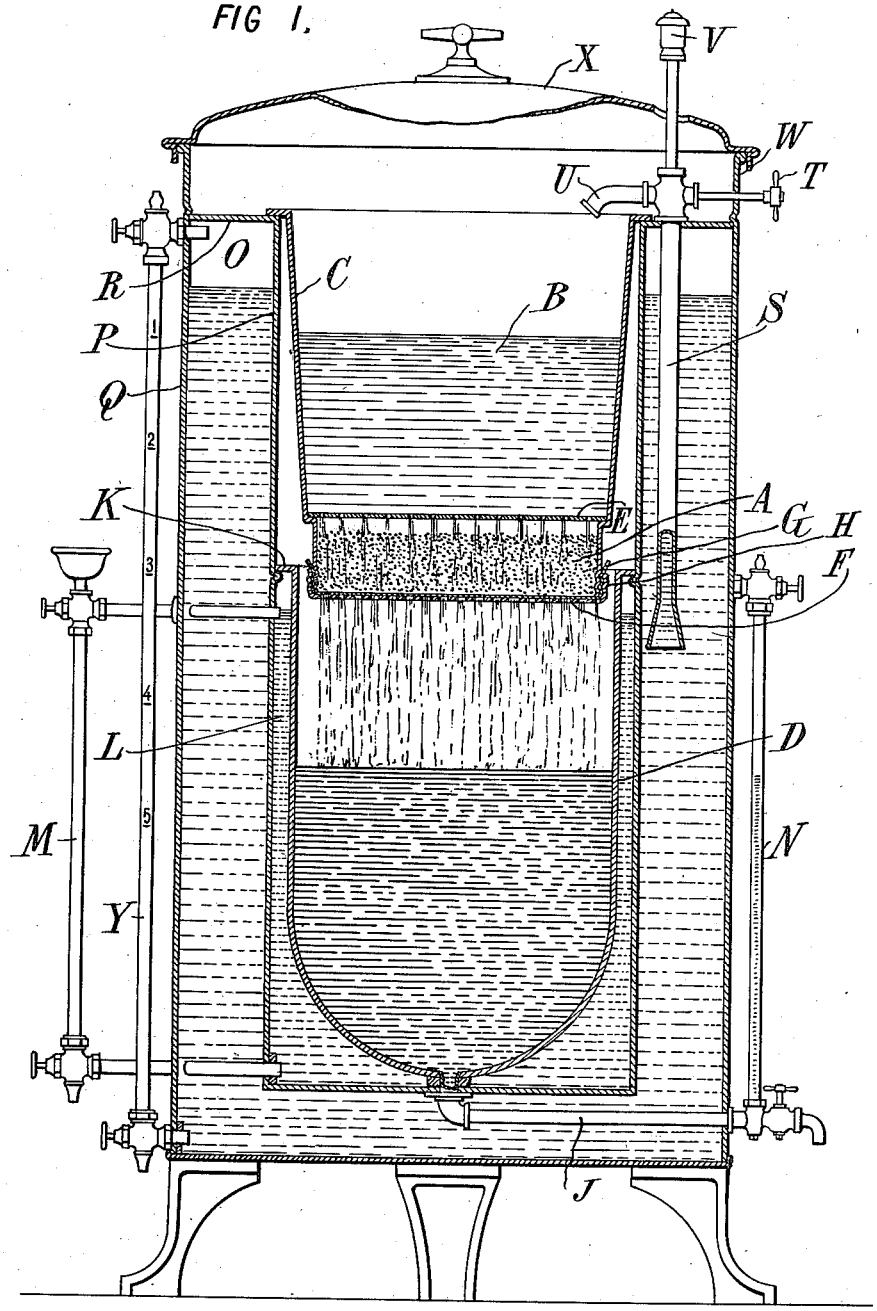

J. S. LANGWORTHY.
COFFEE AND WATER URN.
APPLICATION FILED JUNE 27, 1908.

964,029.

Patented July 12, 1910.

2 SHEETS—SHEET 1.

WITNESSES:
Fred White
René Bruine

INVENTOR:
John S. Langworthy,
By Attorneys,

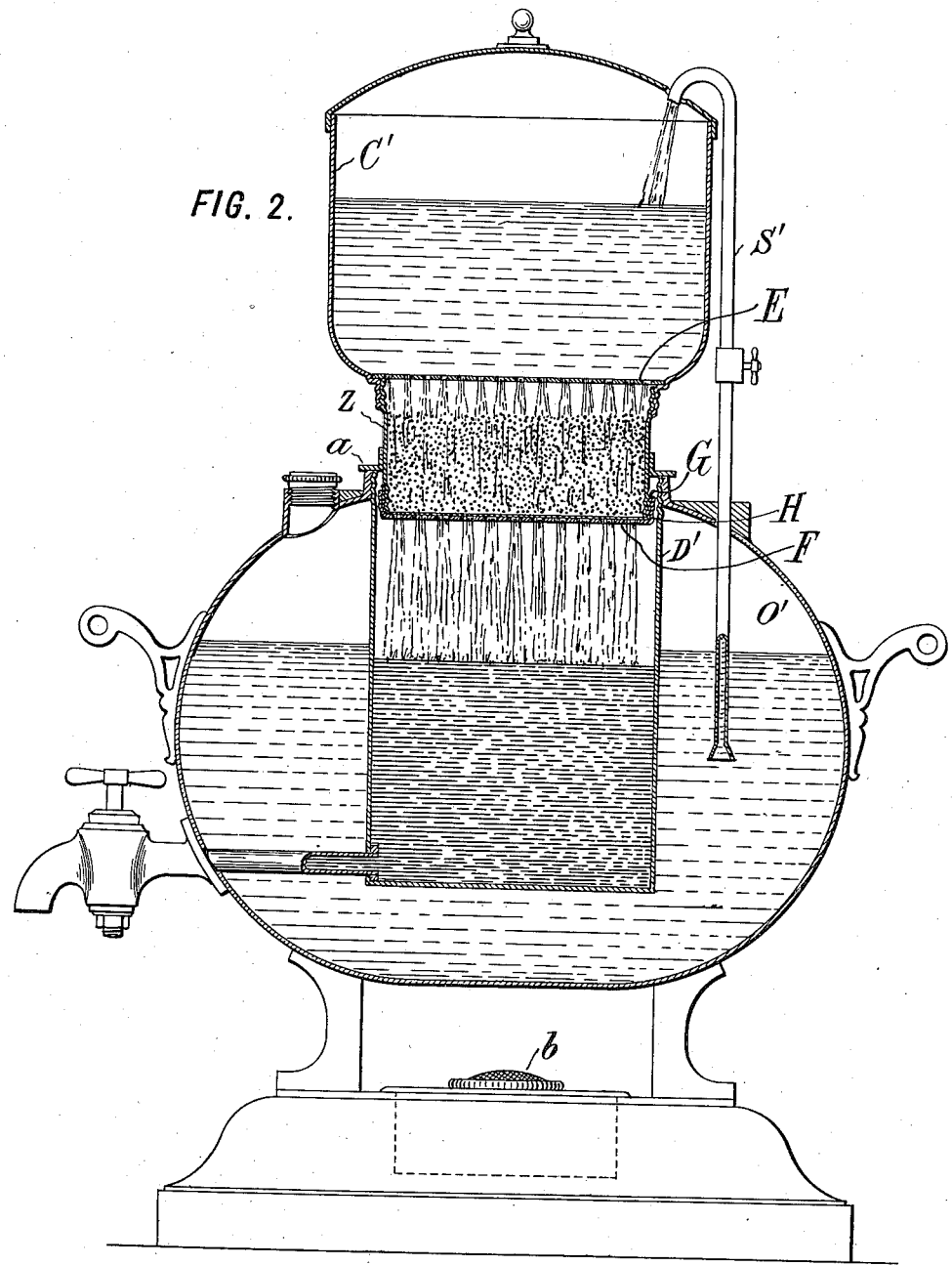

UNITED STATES PATENT OFFICE.

JOHN S. LANGWORTHY, OF NEW YORK, N. Y., ASSIGNOR OF ONE-HALF TO ELIE J. MONEUSE, OF NEW YORK, N. Y.

COFFEE AND WATER URN.

964,029.

Specification of Letters Patent.   Patented July 12, 1910.

Application filed June 27, 1908.   Serial No. 440,741.

*To all whom it may concern:*

Be it known that I, JOHN S. LANGWORTHY, a citizen of the United States, residing in the borough of Brooklyn, county of Kings, city and State of New York, have invented certain new and useful Improvements in Coffee and Water Urns, of which the following is a specification.

This invention aims to provide certain improvements in apparatus for making so-called "drip" coffee, in which the boiling hot water is forced through the coffee by gravitation, or otherwise. It is desirable in such apparatus to provide for obtaining a clear product of full strength and flavor; to perform the extraction thoroughly and quickly without soaking the ground coffee long enough to extract any substantial quantity of tannic acid, which is such an objectionable element in old-fashioned boiled coffee; to insure a uniform manner of operation automatically so as to avoid the necessity of exercising great care and watchfulness; and to be economical in the quantity of coffee used.

The finer the coffee is ground the more easily the oil is extracted from it in the passage of the hot water and the greater the strength secured. But it is also true that the finer the grinding of the coffee the more closely it packs and the greater the resistance to the passage of the water, so that with ordinary open bags much of the water is forced through the sides of the bag above the coffee, necessitating the pouring of the water back into the bag again and again several times until the proper amount of oil has been extracted from the coffee. The more finely ground coffee is also apt to be carried through the bag to some extent and to cloud the liquid. From these considerations it has resulted that moderately coarse coffee is ordinarily used, and this necessitates many repourings and soaking of the particles, and the extraction of tannin so as to give an objectionable bitter taste. It has also been the common practice to heat the water in a separate vessel and pour it upon the ground coffee in a large quantity, or to pipe the water to the urn and leave it to the operator to admit whatever quantity of water he guesses to be advisable, and this practice introduces a large element of chance and irregularity in the product.

According to the present invention an apparatus is provided which with a single percolation through the ground coffee extracts all the desired properties without such a long soaking as to have a bitter taste, permits the use of less coffee than is now customary, and provides beforehand a definite quantity of water which is heated and automatically introduced upon the ground coffee. Further advantages are referred to in detail hereinafter.

The accompanying drawings illustrate embodiments of my invention.

Figure 1 is a vertical diametral section of one type of apparatus. Fig. 2 is a similar section of another type.

Referring to the apparatus illustrated, the ground coffee A is entirely inclosed in a pocket, and the body of water B which is to be converted into coffee is carried in a vessel C and passes through the coffee and thence into a retaining vessel D. The vessel C, which may be called the percolator, has a double bottom; the upper wall E being finely perforated so as to distribute the water over the surface of the coffee and to relieve the coffee of the pressure and to restrict the rate of flow of the water upon the coffee. The upper bottom E of the percolator may be permanently attached or it may be removable, simply resting upon an internal shoulder on the wall of the percolator as shown. For retaining the coffee a coarsely perforated plate F is provided which constitutes substantially a support for a sheet G of filtering cloth or fine paper or the like. The filtering sheet G may be made all the finer without danger of breakage by reason of the support which it receives from the perforated plate F. The plate F is provided with a coarsely threaded flange H screwing upon a corresponding thread on the lower edge of the side of the percolator and fitting the same loosely so as to engage the edge of the filtering sheet of cloth or paper between the two screw-threads and hold the sheet firmly in place. The edge of the sheet is held by the engagement of the lower edge of the wall of the percolator with the flat margin of the perforated plate F. Where the upper bottom E of the percolator is fixed, the coffee may be introduced by inverting the percolator and then applying the filtering sheet. Where the upper bottom E is made removable the coffee may be inserted from above.

The retaining vessel D for the coffee is provided with a draw-off pipe J at its lower end, running to a cock, and is supported by a flange K at its upper edge which rests upon a suitable rib on the inner wall of the surrounding annular vessel. A space is provided between the vessel D and the surrounding vessel, which space is adapted to receive water which is kept hot and which keeps the coffee in the inner vessel D also hot (this feature of the apparatus being shown also in the improved apparatus of my application No. 557,655, filed April 26, 1910, and being claimed in said application). This surrounding space or chamber L will carry a gage M at the outside with a filling cock at the top and a draw-off cock at the bottom. A similar gage N is also provided for the coffee-retaining vessel with connections at the top and bottom, as shown.

The outermost chamber O is formed between two cylindrical walls, an inner wall P and an outer wall Q, and is closed by a head R at the top and by the base B of the apparatus at the bottom. This is the vessel which carries the supply of water all or part of which is to be converted into coffee. For transferring the water from the vessel O to the percolator, a pipe S runs down into the outermost vessel O to any desired extent, and passes through a tight joint in the top of this vessel, being provided above with a cock T and a spigot U, so that when the cock is opened the water in the vessel O may be transferred to the percolator. A safety valve V is provided at the top. The outer wall of the apparatus is provided with a flange W which supports a cover X. A water gage Y serves for observing the amount of water in the outermost space, and also through its connection for admitting and drawing off water to and from the outer space.

In use the reservoir or outside water-jacket O and the inner water chamber L are filled with water, after which a gas burner or other heating means is applied directly below the outer chamber. The percolator is lifted out and the coffee and filtering sheet applied. The percolator carrying the coffee being restored to place, as soon as the water in the outer jacket comes to the boiling point and the necessary pressure is generated within the jacket, water preferably in quantity sufficient to fill the chamber D is forced upward through the pipe S and the spigot U into the percolator. The quantity of water is determined by the length of the pipe S. It will be seen that when sufficient water has been drawn through the pipe to fill the chamber D, there still remains a large amount of hot water in the chamber O that can be used for making tea or the various uses that a separate urn of hot water is put to. This combination of coffee as well as hot water urn in one vessel, instead of two as is now the general method, and in the manner illustrated by the drawings, is an important part of my invention, and furnishes all the essential requirements for both coffee making and other hot water purposes. Or the pipe may be arranged to extend to the bottom, and a hand-valve T used to control the quantity of water. The boiling water in the percolator C passes through the coffee, carrying with it the extracted oil in the manner described, and is retained in the vessel D, where it is kept at the proper temperature by the water in the intermediate chamber L. The water in the intermediate chamber L is not heated directly by the gas or other heating means, and is not heated sufficiently to boil, but is kept at a steady and high heat by the outer jacket of water. This preserves the vessel D from the danger of injury which would result if it came in direct contact with the necessarily boiling water in the outer chamber O, and at the same time prevents the overheating of the liquid coffee. For the best results the liquid coffee should be kept slightly below the boiling point, as it thus retains its freshness and flavor for a longer time, and is not subject to the disintegration changes which take place at the boiling point. The vessel D can under these conditions be made of earthenware or enameled metal which is a great advantage from the point of view of cleanliness.

An important feature of the percolator which adapts it for use in a variety of sizes and under different conditions is the fact that it permits of the use of a great variety of filtering material. Some percolators are adapted for the use of very thin paper or the like, and some for the use of only cloth or heavy paper. Where the apparatus is designed to use heavy paper, thin paper cannot be used because the joint provided is not tight and the water will find its way through the joint without passing through the filtering material. The provision of a loose threaded connection of the two parts between which the filtering sheet is held, as previously explained, makes it possible to make a thoroughly tight joint by screwing up the parts hard, and that whether thin or thick filtering material is used. Consequently the operator can use either coarsely ground or finely ground coffee so as to get the best results from the particular grade of coffee at hand.

It is within the invention to omit the intermediate chamber shown in Fig. 1 and to construct the apparatus as in Fig. 2 with only an outer chamber O' and a retaining vessel D lying immediately in the water in this outer chamber. The pipe S' is shown in this case extending only partly down into the water chamber, so that the level of the water ring shall never be below about the middle point. The percolator C' is provided with a detachable lower portion Z screwing into the body of the percolator, and is supported upon the apparatus by means of a flange a. The vessel D' in this case is screwed into a collar upon the upper end of the water vessel. An alcohol lamp is represented at b for heating the water.

What I claim is:—

1. A coffee-making apparatus including in combination a vessel C with a double bottom, the upper bottom consisting of a finely perforated sheet E, and the lower bottom of a coarsely perforated sheet F of metal, the latter being attachable to the lower edge of the vessel by a loosely fitting screw-thread, whereby a sheet of filtering material may be laid upon the perforated sheet F and may be fastened in place by screwing the latter up tight on the lower edge of the vessel, the space between the two bottoms E and F being adapted to contain the coffee, and the space above the bottom E being adapted to carry a supply of water which is distributed upon the coffee by the plate E, and percolates through the filtering material and the plate F.

2. A coffee-making apparatus including in combination a percolator, a coffee-retaining vessel below said percolator, a water vessel surrounding the coffee vessel, and a pipe extending down into the water vessel and upward over the percolator, the water vessel being closed so that by applying heat thereto the water will be forced over into the percolator and will pass therefrom into the coffee-retaining vessel, the lower end of said pipe being above the level of the bottom of the coffee-retaining vessel, so as to leave in the water vessel a quantity of water surrounding the made coffee, and the space in the water vessel above the lower end of the pipe being approximately equal in volume to that in the coffee-retaining vessel.

3. A coffee-making apparatus including in combination a percolator and a coffee-retaining vessel of approximately the same capacity below said percolator, a surrounding water vessel having a capacity sufficient to approximately fill said percolator and to retain a quantity sufficient to surround the greater part of said coffee-retaining vessel, and a pipe extending down into the water vessel and upward over the percolator, the water vessel being closed so that by applying heat thereto water will be forced over into the percolator, said pipe being extended down into the water to a point above the level of the bottom of the coffee-retaining vessel so as to leave in the water vessel a quantity of water surrounding the made coffee.

4. A coffee-making apparatus including in combination a percolator, a coffee retaining vessel below said percolator, a water vessel surrounding the coffee vessel, and a pipe extending down into the water vessel to a point approximately level with the upper part of the coffee-retaining vessel and upward over the percolator, the water vessel being closed so that by applying heat thereto part of the water will be forced over into the percolator and will pass therefrom into the coffee-retaining vessel, and the water remaining in said water vessel will retain the heat in the coffee-retaining vessel.

5. A coffee-making apparatus including in combination a percolator C, a vessel D for retaining liquid coffee arranged below said percolator, said apparatus having a chamber O surrounding said vessel D, a pipe S extending down into the chamber O to a point approximately level with the upper part of the vessel D and out of the upper part thereof and having a spigot U extending over the percolator C.

6. A coffee-making apparatus including in combination vertical walls P and Q and upper and lower walls forming a closed chamber O for carrying water, said wall P having a rib on its inner face, a vessel D for carrying liquid coffee and having a flange K supported upon said rib on the inner face of the wall P, a percolator C having at its upper end a flange resting upon the top of the chamber O, an intermediate chamber L being formed between the vessel D and the outer chamber O, a pipe S in said outer chamber O and extending up through the top and having a spigot U adapted to discharge into the percolator, whereby when applying heat to the water in the outer chamber to boil the same sufficient water is driven over into the percolator to make the desired quantity of coffee, and passes thence into the liquid coffee vessel D, where it is maintained at a high temperature below the boiling point by contact with the water in the chamber L, said pipe S terminating at its lower end at a point above the level of the bottom of the vessel D, so as to leave sufficient water in the outer chamber O for the ordinary uses of a separate hot water urn and to heat by contact the water in the intermediate chamber L.

7. A coffee making apparatus including in combination a vessel C with a double bottom consisting of perforated-sheets, the lower sheet being attachable to the lower edge of the vessel by a loosely fitting screw-thread, whereby a sheet of filtering material may be laid upon the lower sheet and fastened in place by screwing up said lower sheet tight on the lower edge of the vessel, the space between the two sheets being adapted to contain the coffee and the space above the upper sheet being adapted to carry a supply of water which is distributed upon the coffee by said upper perforated sheet and percolates through the filtering material and the lower sheet.

In witness whereof, I have hereunto signed my name in the presence of two subscribing witnesses.

JOHN S. LANGWORTHY.

Witnesses:
DOMINGO A. USINA,
THEODORE T. SNELL.